United States Patent
Hojo et al.

(10) Patent No.: US 10,530,014 B2
(45) Date of Patent: Jan. 7, 2020

(54) ASSEMBLED BATTERY

(71) Applicant: TOYOTA JIDOSHA KABUSHIKI KAISHA, Toyota-shi, Aichi-ken (JP)

(72) Inventors: Takayuki Hojo, Nagoya (JP); Masaru Ishii, Miyoshi (JP); Masato Kamiya, Toyota (JP); Tetsuya Kaneko, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 107 days.

(21) Appl. No.: 15/794,348

(22) Filed: Oct. 26, 2017

(65) Prior Publication Data

US 2018/0131035 A1    May 10, 2018

(30) Foreign Application Priority Data

Nov. 8, 2016    (JP) .................. 2016-217912

(51) Int. Cl.
  *H01M 10/058*  (2010.01)
  *H01M 2/02*    (2006.01)
  *H01M 10/04*   (2006.01)

(52) U.S. Cl.
  CPC ........... *H01M 10/058* (2013.01); *H01M 2/02* (2013.01); *H01M 10/0431* (2013.01)

(58) Field of Classification Search
  None
  See application file for complete search history.

(56) References Cited

U.S. PATENT DOCUMENTS

| 2004/0170887 A1* | 9/2004 | Masumoto .......... H01M 2/0404 429/61 |
| 2015/0171405 A1* | 6/2015 | Lee .................. H01M 2/24 429/89 |
| 2015/0171411 A1 | 6/2015 | Kobayashi et al. |
| 2017/0047578 A1* | 2/2017 | Minagata ............. H01G 9/12 |

FOREIGN PATENT DOCUMENTS

| JP | 2015-002113 A | 1/2015 |
| JP | 2015-153673 A | 8/2015 |
| JP | 2016-162621 A | 9/2016 |
| JP | 2017-27781 A | 2/2017 |
| KR | 10-2015-0014473 A | 2/2015 |
| KR | 10-2015-0045241 A | 4/2015 |
| KR | 10-2016-0053735 A | 5/2016 |

* cited by examiner

*Primary Examiner* — Karie O'Neill Apicella
(74) *Attorney, Agent, or Firm* — Sughrue Mion, PLLC

(57) ABSTRACT

There is provided an assembled battery including a plurality of single cells and a plurality of bus bars connecting the plurality of single cells in series. The plurality of single cells is arranged such that a pair of flat side surfaces faces each other. The single cells each include a battery case, a positive electrode sheet, a negative electrode sheet, a positive electrode terminal, a negative electrode terminal, an electrical resistor disposed in a conductive path between the positive electrode sheet and the positive electrode terminal, and a pressure operative type current interruption mechanism disposed in a conductive path between the negative electrode sheet and the negative electrode terminal.

4 Claims, 4 Drawing Sheets

ASSEMBLED BATTERY

INCORPORATION BY REFERENCE

The disclosure of Japanese Patent Application No. 2016-217912 filed on Nov. 8, 2016 including the specification, drawings and abstract is incorporated herein by reference in its entirety.

BACKGROUND

1. Technical Field

The present disclosure relates to an assembled battery, and specifically, to an assembled battery including a plurality of secondary batteries.

2. Description of Related Art

An assembled battery in which a plurality of secondary batteries (single cells) are electrically connected is widely used as a high output power supply mounted in vehicles and the like. For example, in Japanese Patent Application Publication No. 2015-002113 (JP 2015-002113 A), an assembled battery (a power storage module) in which a plurality of single cells are disposed in a predetermined arrangement direction, and the plurality of single cells are connected in series by bus bars is disclosed. In the assembled battery described in JP 2015-002113 A, when an external force is applied, an external short circuit path is formed between single cells. Thus, a current flows through the external short circuit path, and an SOC of each single cell is lowered.

SUMMARY

However, according to studies by the inventors, in the above techniques, a certain time, for example, about several seconds, is necessary until the state is in a state in which an SOC of a single cell is lowered. Therefore, Joule heat (resistance heat) is generated while an SOC of a single cell is lowered, and the temperature of the single cell sharply increases. This will be described in detail with reference to FIG. 4.

For example, a sharp conductive foreign body F such as a nail is stuck from the upstream side U in an arrangement direction x into an assembled battery 100 in which a plurality of single cells 110A, 110B, and 110C are arranged in the arrangement direction x, and connected in series by a bus bar 170. Then, the conductive foreign body F penetrates through the plurality of single cells 110A and 110B. In this case, in the single cell 110A that is disposed on the furthest upstream side U (on the left side in FIG. 4) in the arrangement direction x, regarding a direction from which the nail has been stuck, a temperature rise of an extent similar to that which occurs when a conductive foreign body is stuck into a single cell alone occurs. However, according to studies by the inventors, in the single cells 110B disposed at the $2^{nd}$ and subsequent positions from the upstream side U in the arrangement direction x, it was newly found that a more rapid temperature rise than that in the single cell 110A disposed on the most upstream side U occurred.

That is, when the conductive foreign body F penetrates through the single cells 110A and 110B, a positive electrode sheet 120A and a negative electrode sheet 130A are short-circuited inside the single cell 110A due to the conductive foreign body F. Similarly, inside the single cell 110B also, a positive electrode sheet 120B and a negative electrode sheet 130B are short-circuited due to the conductive foreign body F. Accordingly, a short circuit current E1 flows in the single cells 110A and 110B. A temperature of the single cells 110A and 110B increases due to Joule heat of the short circuit current E1. In addition, an external conductive path is formed by the positive electrode sheet 120B of the single cell 110B, a bus bar 170, the negative electrode sheet 130A of the single cell 110A, and the conductive foreign body F. Accordingly, external short circuiting occurs between the positive electrode sheet 120B of the single cell 110B and the negative electrode sheet 130A of the single cell 110A. Then, a high short circuit current E2 of about 700 A flows. That is, two short circuit currents including the short circuit current E1 generated inside the single cell 110B and the short circuit current E2 generated due to external short circuiting flow in the negative electrode sheet 130B of the single cell 110B. As a result, a more rapid temperature rise occurs in the single cell 110B than in the single cell 110A. As described above, when a conductive foreign body penetrates through two or more single cells, in all single cells disposed at the $2^{nd}$ and subsequent positions from the upstream side in the direction in which the conductive foreign body is stuck, a rapid temperature rise due to a short circuit current of external short circuiting may occur.

The present disclosure provides an assembled battery capable of preventing a rapid temperature rise due to a short circuit current when a conductive foreign body penetrates through a plurality of single cells connected in series.

According to an aspect of the present disclosure, there is provided an assembled battery including a plurality of single cells and a plurality of bus bars connecting the plurality of single cells in series. The plurality of single cells each include a pair of flat side surfaces and the flat side surfaces are arranged to face each other. The single cells each include a battery case having the above pair of flat side surfaces, a positive electrode sheet disposed inside the battery case, a negative electrode sheet disposed inside the battery case, a nonaqueous electrolyte disposed inside the battery case, a positive electrode terminal which is electrically connected to the positive electrode sheet inside the battery case and a part of which protrudes outside of the battery case, a negative electrode terminal which is electrically connected to the negative electrode sheet inside the battery case and a part of which protrudes outside of the battery case, an electrical resistor disposed in a conductive path between the positive electrode sheet and the positive electrode terminal, and a pressure operative type current interruption mechanism disposed in a conductive path between the negative electrode sheet and the negative electrode terminal.

When a sharp conductive foreign body such as a nail penetrates through a plurality of single cells, the temperature inside a single cell rapidly increases. In this case, in the assembled battery having the above configuration, the resistance between the positive electrode sheet and the positive electrode terminal is immediately increased by the electrical resistor. In addition, the current interruption mechanism operates quickly, and a current between the negative electrode sheet and the negative electrode terminal is blocked. Thus, it is possible to prevent a large current from flowing between the single cells through the bus bar. Therefore, it is possible to prevent a rapid temperature rise in the single cells that are disposed at the $2^{nd}$ and subsequent positions in the arrangement direction.

The resistor may be, for example, a positive temperature coefficient (PTC) element having a positive temperature resistance coefficient.

In an aspect of the present disclosure, no current interruption mechanism may be provided in the conductive path between the positive electrode terminal and the positive electrode sheet.

In an aspect of the present disclosure, the current interruption mechanism may include a first member and a second member, and when an internal pressure of the battery case exceeds an operating pressure of the current interruption mechanism, bonding between the first member and the second member may be cut, a conductive path between the negative electrode sheet and the negative electrode terminal may be cut, and a current may be blocked.

In a preferable aspect of the assembled battery disclosed here, no current interruption mechanism is provided in the conductive path between the positive electrode terminal and the positive electrode sheet. Therefore, the effect of the present disclosure can be obtained with a simple configuration. Accordingly, it is possible to increase production efficiency of the assembled battery and reduce manufacturing costs.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
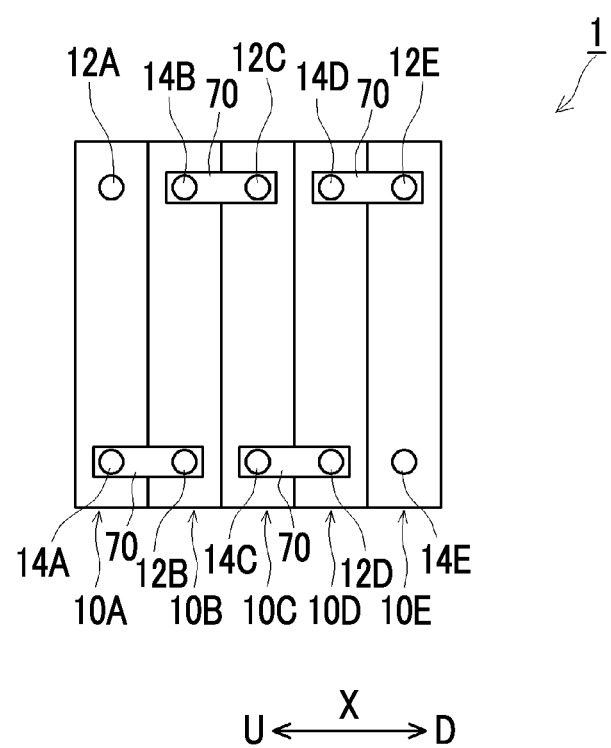
FIG. 1 is a plan view schematically showing an assembled battery according to an embodiment.

Embodiments of the present disclosure will be appropriately described below with reference to the drawings. Here, components other than those particularly mentioned in this specification that are necessary for implementation of the present disclosure (for example, components that do not characterize the present disclosure and a general battery production process for a battery) can be recognized by those skilled in the art as design matters based on the related art in the field. The present disclosure can be implemented based on content disclosed in this specification and common general technical knowledge in the field. In addition, members and portions having the same functions are denoted by the same reference numerals in the following drawings, and redundant descriptions thereof will be omitted or simplified. The sizes (a length, a width, a thickness, and the like) in the drawings do not reflect actual sizes. Here, the symbol x in the drawings represents a direction in which single cells are arranged. The symbols U and D in the drawings represent an upstream side and a downstream side, respectively.

FIG. 1 is a plan view schematically showing an assembled battery 1 according to an embodiment. The assembled battery 1 includes a plurality of single cells 10A, 10B, 10C, 10D, and 10E, and a plurality of bus bars 70 electrically connecting the plurality of single cells 10A, 10B, 10C, 10D, and 10E. The plurality of single cells 10A, 10B, 10C, 10D, and 10E have the same shape. The single cells 10A, 10B, 10C, 10D, and 10E have the same flat rectangular shape. The single cells 10A, 10B, 10C, 10D, and 10E each have a pair of flat side surfaces (wide surfaces). The single cells 10A, 10B, 10C, 10D, and 10E are arranged parallel to each other in an arrangement direction x such that the flat side surfaces face to each other. Here, between the single cells 10A, 10B, 10C, 10D, and 10E, for example, a heat dissipation member for efficiently dissipating heat generated in the single cells 10A, 10B, 10C, 10D, and 10E, a spacer as a length adjustment member, and the like may be disposed.

Positive electrode terminals 12A, 12B, 12C, 12D, and 12E, and negative electrode terminals 14A, 14B, 14C, 14D, and 14E are disposed on external surfaces of the single cells 10A, 10B, 10C, 10D, and 10E. In the assembled battery 1, the plurality of single cells 10A, 10B, 10C, 10D, and 10E are connected in series by the plurality of bus bars 70. In other words, the positive electrode terminals 12A, 12B, 12C, 12D, and 12E and the negative electrode terminals 14A, 14B, 14C, 14D, and 14E of adjacent single cells 10A, 10B, 10C, 10D, and 10E are alternately connected by the bus bars 70. The positive electrode terminal 12A of the single cell 10A disposed at the end (the left side end in FIG. 1) on the upstream side U in the arrangement direction x is a positive electrode output terminal that is open to be connectable to the outside. In addition, the negative electrode terminal 14E of the single cell 10E disposed at the end (the right side end in FIG. 1) on the downstream side D in the arrangement direction x is a negative electrode output terminal that is open to be connectable to the outside. Here, the number of single cells constituting the assembled battery 1 is 5, but the present disclosure is not limited thereto. The number of single cells constituting the assembled battery is typically an odd number of 10 or more, for example, about 10 to 100.

Figure 2:
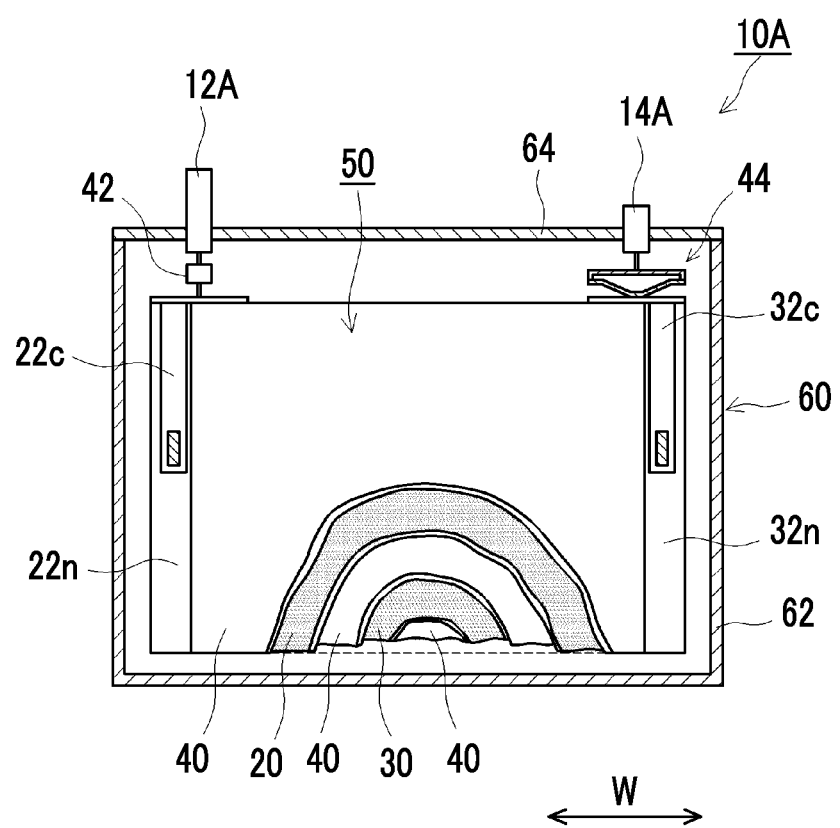
FIG. 2 is a cross-sectional view schematically showing an internal structure of a single cell according to an embodiment.

FIG. 2 is a cross-sectional view schematically showing an internal structure of the single cell 10A constituting the assembled battery 1. Note that, while the single cell 10A is described as an example here, the single cells 10B, 10C, 10D, and 10E constituting the assembled battery 1 have the same configuration as the single cell 10A. The single cell 10A has a configuration in which an electrode body 50 and a nonaqueous electrolyte (not shown) are accommodated inside a battery case 60.

The battery case 60 includes a battery case main body 62 and a cover plate 64 for closing an opening thereof. A material of the battery case 60 is not particularly limited, and is, for example, a light metal such as aluminum. The battery case main body 62 has a rectangular parallelepiped shape (square shape) having an upper end that is open and having a bottom. The positive electrode terminal 12A and the negative electrode terminal 14A protrude from the top of the cover plate 64.

Figure 3A:
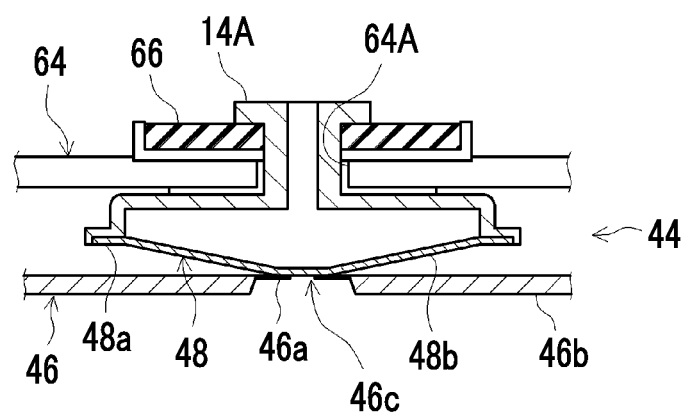
FIG. 3A is a cross-sectional view schematically showing a current interruption mechanism according to an embodiment and shows a state before it operates.

When the negative electrode terminal 14A of the single cell 10A is exemplified, as shown in FIG. 3A, a through-hole 64A is formed in the cover plate 64. The negative electrode terminal 14A is inserted into the through-hole 64A. The negative electrode terminal 14A is fixed to the cover plate 64 by bending the upper end and the lower end. An annular insulating member 66 is disposed between the cover plate 64 and the negative electrode terminal 14A. The insulating member 66 is made of, for example, a synthetic resin. Thus, the cover plate 64 and the negative electrode terminal 14A are insulated.

As shown in FIG. 2, the electrode body 50 includes a positive electrode sheet 20, a negative electrode sheet 30, and a separator sheet 40. In the electrode body 50, the positive electrode sheet 20 and the negative electrode sheet 30 are laminated with the separator sheet 40 therebetween. The electrode body 50 may be a laminated electrode body in which a rectangular positive electrode sheet and a rectangular negative electrode sheet are laminated with a separator sheet therebetween, and may be a wound electrode body in which a band-like positive electrode sheet and a band-like negative electrode sheet are laminated with a separator sheet therebetween and wound in a longitudinal direction.

The positive electrode sheet 20 includes a positive electrode current collector and a positive electrode active material layer fixed to a surface thereof. As the positive electrode current collector, a conductive member made of a metal (for example, aluminum and nickel) having favorable conductivity is preferable. The positive electrode active material layer is formed with a predetermined width on a surface of the positive electrode current collector in a width direction W. At one end (the left side end in FIG. 2) of the positive electrode current collector in the width direction W, a positive electrode active material layer non-forming portion 22n in which no positive electrode active material layer is formed is provided. The positive electrode sheet 20 is electrically connected to the positive electrode terminal 12A through a positive electrode current collector plate 22c provided on the positive electrode active material layer non-forming portion 22n.

The positive electrode active material layer includes a positive electrode active material. As the positive electrode active material, for example, a lithium transition metal composite oxide such as $LiNiO_2$, $LiCoO_2$, $LiMn_2O_4$, $LiNi_{1/3}Co_{1/3}Mn_{1/3}O_2$, and $LiNi_{0.5}Mn_{1.5}O_4$ is preferable. The positive electrode active material layer may include components other than the positive electrode active material, for example, a conductive material and a binder. As the conductive material, a carbon material, for example, carbon black (for example, acetylene black and Ketjen black), activated carbon, and graphite, may be exemplified. As the binder, for example, a halogenated vinyl resin such as polyvinylidene fluoride (PVdF) and a polyalkylene oxide such as polyethylene oxide (PEO) may be exemplified.

The negative electrode sheet 30 includes a negative electrode current collector and a negative electrode active material layer fixed to a surface thereof. As the negative electrode current collector, a conductive material made of a metal (for example, copper and nickel) having favorable conductivity is preferable. The negative electrode active material layer is formed with a predetermined width on a surface of the negative electrode current collector in the width direction W. At one end (the right side end in FIG. 2) of the negative electrode current collector in the width direction W, a negative electrode active material layer non-forming portion 32n in which no negative electrode active material layer is formed is provided. The negative electrode sheet 30 is electrically connected to the negative electrode terminal 14A through a negative electrode current collector plate 32c provided on the negative electrode active material layer non-forming portion 32n.

The negative electrode active material layer includes a negative electrode active material. As the negative electrode active material, for example, a graphite carbon material such as natural graphite, artificial graphite, and amorphous coated graphite (in the form in which amorphous carbon is applied to a surface of graphite particles) is preferable. The negative electrode active material layer may include components other than the negative electrode active material, for example, a thickener and a binder. As the thickener, for example, celluloses such as carboxymethyl cellulose (CMC) and methylcellulose (MC) may be exemplified. As the binder, for example, rubbers such as styrene butadiene rubber (SBR) and a halogenated vinyl resin such as polyvinylidene fluoride (PVdF) may be exemplified.

The separator sheet 40 is disposed between the positive electrode sheet 20 and the negative electrode sheet 30. The separator sheet 40 insulates the positive electrode active material layer and the negative electrode active material layer. The separator sheet 40 is porous so that charge carriers contained in a nonaqueous electrolyte solution can penetrate therethrough. As the separator sheet 40, for example, a resin sheet of such as polyethylene (PE) and polypropylene (PP) is preferable. The separator sheet 40 may include a heat resistant layer (HRL layer) containing inorganic compound particles (inorganic filler) such as alumina on the surface of the resin sheet.

Typically, the nonaqueous electrolyte includes a nonaqueous solvent and a supporting salt. As the nonaqueous solvent, for example, carbonates and esters may be exemplified. The supporting salt is dissociated in a nonaqueous solvent and generates charge carriers. As the supporting salt, a lithium salt, a sodium salt, a magnesium salt, and the like may be exemplified. The nonaqueous electrolyte may include, for example, a gas generating agent such as biphenyl (BP) and cyclohexylbenzene (CHB), an oxalato complex compound containing boron atoms and/or phosphorus atoms, a film forming agent such as vinylene carbonate (VC), various additives such as a dispersant and a thickener, and the like. The nonaqueous electrolyte may be a (gel-like) polymer.

A PTC element 42 is disposed between the positive electrode terminal 12A and the positive electrode sheet 20, and specifically, between the positive electrode terminal 12A and the positive electrode current collector plate 22c. The PTC element 42 includes, for example, barium titanate and a rare earth element in a very small amount. The PTC element 42 is an example of an electrical resistor. When the temperature of the PTC element 42 itself is lower than the Curie point thereof, a resistance value of the PTC element 42 is small. When the temperature of the PTC element 42 itself reaches the Curie point or higher, a resistance value of the PTC element 42 increases sharply. Thus, the resistance value between the positive electrode terminal 12A and the positive electrode sheet 20 instantaneously increases, and typically, a flow of a current between the positive electrode terminal 12A and the positive electrode sheet 20 is substantially blocked.

The Curie point of the PTC element 42 can be arbitrarily set, for example, by adjusting the constituent materials of the PTC element 42. In an example, the Curie point of the PTC element 42 is a temperature that the single cell 10A is considered not to reach in general use, specifically, 80 to 100° C., for example, 90 to 100° C. In addition, the resistance value when the temperature of the PTC element 42 is lower than the Curie point is not particularly limited, and typically, is 1 to 500 mΩ, for example, 1 to 300 mΩ. The resistance value when the temperature of the PTC element 42 reaches the Curie point or higher is not particularly limited, and typically, is 1000Ω or more, for example, 3000 to 10000Ω.

In the present embodiment, there is one PTC element 42. The PTC element 42 is connected in series between the positive electrode terminal 12A and the positive electrode sheet 20. However, the number of PTC elements 42 may be a plural number of two or more. In this case, the plurality of PTC elements 42 may be connected in parallel.

A pressure operative type current interruption mechanism (current interrupt device (CID)) 44 is disposed between the negative electrode terminal 14A and the negative electrode sheet 30, and specifically, between the negative electrode terminal 14A and the negative electrode current collector plate 32c. The current interruption mechanism 44 is connected in series between the negative electrode terminal 14A and the negative electrode sheet 30. When the internal pressure of the battery case 60 exceeds a predetermined operating pressure, the pressure operative type current interruption mechanism 44 forcibly blocks a conductive path between the negative electrode terminal 14A and the negative electrode sheet 30. The operating pressure of the current interruption mechanism 44 is not particularly limited, and typically 0.5 to 1 MPa, for example, 0.7 to 0.9 MPa.

As shown in FIG. 3A, the current interruption mechanism 44 includes a first member 46 and a second member 48. The first member 46 is disposed above (in a direction of the cover plate 64) the positive electrode sheet 20 of the electrode body 50. The first member 46 is disposed parallel to the cover plate 64. The first member 46 is made of, for example, a highly conductive material such as copper. The first member 46 has a rectangular plate shape. The first member 46 includes a thin portion 46a and a thick portion 46b formed relatively thick in the periphery thereof. The thin portion 46a is formed in a circular shape. A circular opening 46c is formed in a central portion of the thin portion 46a. A groove (notch) for breaking (not shown) is formed in the thin portion 46a. The groove has a diameter slightly larger than the opening 46c and is formed along the outer edge of the opening 46c.

The second member 48 is disposed between the first member 46 and the negative electrode terminal 14A provided on the cover plate 64 and forms a conductive path between the members. The second member 48 is made of, for example, a highly conductive material such as copper. The second member 48 has a rectangular plate shape. The second member 48 is an inverted plate. The second member 48 includes a flange portion 48a and a tapered convex portion 48b. The flange portion 48a and the convex portion 48b are integrally formed. At least a part of the flange portion 48a is bonded to a lower end of the negative electrode terminal 14A. The convex portion 48b is disposed to block the opening 46c of the first member 46. The convex portion 48b is bonded on the opening 46c side of the groove of the thin portion 46a.

When the assembled battery 1 is generally used, as shown in FIG. 3A, a conductive path is formed between the negative electrode sheet 30 of the electrode body 50 and the negative electrode terminal 14A inside the single cell 10A. That is, a current flows from the negative electrode current collector plate 32c of the negative electrode sheet 30 to the negative electrode terminal 14A through the first member 46 and the second member 48.

Figure 3B:
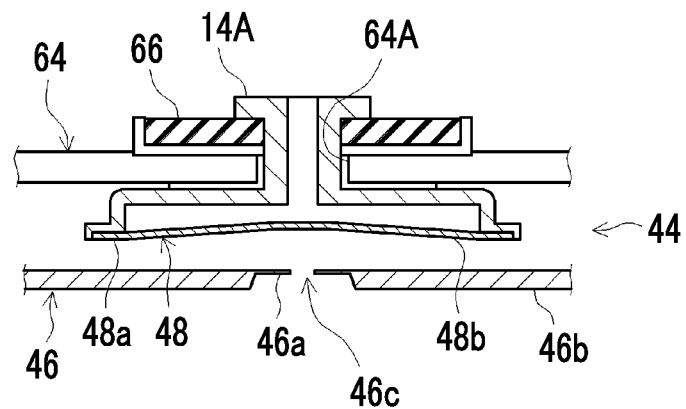
FIG. 3B is a cross-sectional view schematically showing a current interruption mechanism according to an embodiment and shows a state after it operates.
Figure 4:
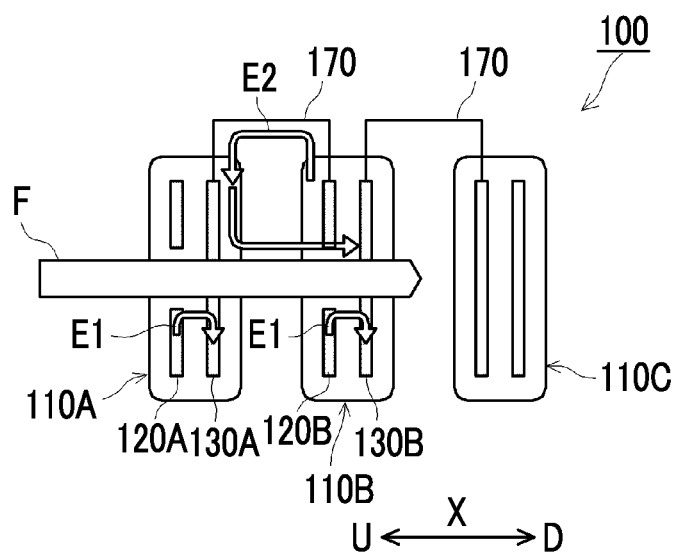
FIG. 4 is an explanatory diagram schematically showing a state in which a conductive foreign body is stuck into an assembled battery of the related art.

On the other hand, when the conductive foreign body F is stuck into the assembled battery 1, and the positive electrode sheet 20 and the negative electrode sheet 30 are short-circuited inside the single cell 10A, a short circuit current flows. According to a short circuit current during the internal short circuiting, the temperature of the single cell 10A increases, and a gas inside the single cell 10A expands. In addition, a component (for example, a nonaqueous solvent) of the nonaqueous electrolyte electrically decomposes, and a gas is generated in the battery case 60. Accordingly, a pressure inside the single cell 10A increases. The pressure is applied to a lower surface of the convex portion 48b of the second member 48 and pushes the convex portion 48b upward. Then, when the internal pressure of the battery case 60 exceeds an operating pressure of the current interruption mechanism 44, as shown in FIG. 3B, the convex portion 48b of the second member 48 is separated from the first member 46, and is inverted in a direction of the cover plate 64 using the flange portion 48a as a supporting point. Due to the deformation of the convex portion 48b, bonding between the first member 46 and the second member 48 is cut. As a result, a conductive path between the negative electrode terminal 14A and the negative electrode current collector plate 32c is cut, and a current is blocked.

As described above, in the assembled battery 1 according to the present embodiment, when a conductive foreign body penetrates through the plurality of single cells 10A, 10B, 10C, 10D, and 10E, if the temperature in the single cells 10A, 10B, 10C, 10D, and 10E increases, the resistance between the positive electrode terminals 12A, 12B, 12C, 12D, and 12E and the positive electrode sheet 20 sharply increases due to the PTC element 42. In addition, the pressure operative type current interruption mechanism 44 operates and a current between the negative electrode terminals 14A, 14B, 14C, 14D, and 14E and the negative electrode sheet 30 is blocked. In such a configuration, in the assembled battery 1, it is difficult to form an external short circuit path via the bus bar 70 and the conductive foreign body. Typically, internal short circuiting occurs only in the single cells 10A, 10B, 10C, 10D, and 10E through which the conductive foreign body has penetrated. Therefore, it is possible to prevent the occurrence of a rapid temperature rise due to external short circuiting in the single cells disposed at the $2^{nd}$ and subsequent positions from the upstream side in the direction in which the conductive foreign body is stuck. Accordingly, it is possible to minimize the temperature rise of each of the single cells to the extent of the temperature rise, for example, when a conductive foreign body is stuck into a single secondary battery.

The assembled battery 1 can be used for various applications. However, there is a feature in which, when the single cells 10A, 10B, 10C, 10D, and 10E have the above configuration, durability (for example, resistance to nail penetration) in response to the conductive foreign body is improved compared with that of products in the related art. Therefore, this feature is utilized and the assembled battery 1 can be preferably applied to a large capacity secondary battery, for example, a secondary battery having a battery capacity of 20 Ah or more, typically, 25 Ah or more, for example, 30 Ah or more. In addition, the assembled battery 1 can be suitably used as a power source (driving power supply) of a moving body, for example, a hybrid vehicle or an electric vehicle.

Several examples related to the present disclosure will be described below, but the present disclosure is not intended to be limited to such specific examples.

1. Production of an assembled battery. A positive electrode sheet in which a positive electrode active material layer containing $LiNi_{1/3}Co_{1/3}Mn_{1/3}O_2$ was fixed to a surface of an aluminum foil with a thickness of 12 μm was prepared. In addition, a negative electrode sheet in which a negative electrode active material layer containing graphite was fixed to a surface of a copper foil with a thickness of 10 μm was prepared. Next, the positive electrode sheet and the negative electrode sheet prepared above were laminated with a separator (a resin sheet having a 3-layer (PP/PE/PP) structure) therebetween to produce a laminated electrode body. Next, the above produced laminated electrode body was accommodated in a rectangular battery case together with a non-aqueous electrolyte solution.

Next, a PTC element (Curie point: 130° C., a resistance value at a temperature of the Curie point or higher: 3000Ω) was disposed between the positive electrode sheet and the positive electrode terminal. In addition, a CID (operating pressure: 0.8 MPa) was disposed between the negative electrode sheet and the negative electrode terminal. In this manner, five single cells having a theoretical capacity of 35 Ah were produced. Even-numbered single cells among the five single cells were rotated 180°, and arranged in a row in a predetermined arrangement direction x such that wide surfaces of the five single cells faced each other. Then, positive electrode terminals and negative electrode terminals of the plurality of single cells were connected in series by bus bars to produce an assembled battery in Example 1 shown in FIG. 1.

In Comparative Example 1, an assembled battery was produced in the same manner as in Example 1 except that a CID was disposed in place of a PTC element between a positive electrode sheet and a positive electrode terminal, and no safety mechanism was provided between a negative electrode sheet and a negative electrode terminal. In Comparative Example 2, an assembled battery was produced in the same manner as in Example 1 except that no PTC element was disposed between a positive electrode sheet and a positive electrode terminal. In Comparative Example 3, an assembled battery was produced in the same manner as in Example 1 except that a CID was disposed in place of a PTC element between a positive electrode sheet and a positive electrode terminal, and a PTC element was disposed in place of a CID between a negative electrode sheet and a negative electrode terminal. In Comparative Example 4, an assembled battery was produced in the same manner as in Example 1 except that a CID was disposed in place of a PTC element between a positive electrode sheet and a positive electrode terminal. In Comparative Example 5, an assembled battery was produced in the same manner as in Example 1 except that no safety mechanism was provided between a positive electrode sheet and a positive electrode terminal, and between a negative electrode sheet and a negative electrode terminal, and a fuse was disposed in the middle of the bus bar.

2. Nail penetration test. Under a temperature environment at 25° C., the assembled batteries (Example 1 and Comparative Examples 1 to 5) were charged, and adjusted to a charged state of SOC 100% (fully charged). Next, a thermocouple was attached to a position that was slightly below the center of the wide surface of the battery case of single cells. Next, under a temperature environment at 25° C., a nail (diameter 6 mm, tip sharpness 60°) made of tungsten was stuck in the arrangement direction x near the center of the wide surface to which the thermocouple was attached. The nail was perpendicularly stuck into the single cell at a nail penetration rate of 25 mm/sec, and penetrated through all of the five single cells constituting the assembled battery. This test was performed in a case in which a nail was stuck in a first direction to the downstream side D from the upstream side U in the arrangement direction x and vice versa in a case in which a nail was stuck in a second direction to the upstream side U from the downstream side D. Then, a voltage drop amount (V) 0.1 seconds after the nail had penetrated was measured for the single cells disposed at the $2^{nd}$ to $5^{th}$ positions in a nail penetration direction. In addition, during the nail penetration test, a change in temperature of the single cells was recorded. Table 1 shows a voltage drop amount and a maximum temperature during the nail penetration test in these directions.

TABLE 1

| | Safety mechanism | | | First direction (U→D) | | Second direction (D→U) | | |
|---|---|---|---|---|---|---|---|---|
| | Positive electrode side | Negative electrode side | Bus bar | Voltage drop amount [V] of single cells in the $2^{nd}$ and subsequent positions after 0.1 s | Maximum temperature [° C.] | Voltage drop amount [V] of single cells in the $2^{nd}$ and subsequent positions after 0.1 s | Maximum temperature [° C.] | Determination |
| Example 1 | PTC | CID | — | 0.0 | 450 | 0.0 | 440 | good |
| Comparative Example 1 | CID | — | — | 1.0 | 620 | 0.0 | 440 | bad |
| Comparative Example 2 | — | CID | — | 0.0 | 450 | 1.1 | 640 | bad |
| Comparative Example 3 | CID | PTC | — | 0.8 | 630 | 0.0 | 460 | bad |
| Comparative Example 4 | CID | CID | — | 0.0 | 470 | 0.0 | 450 | average |
| Comparative Example 5 | — | — | Fuse | 0.7 | 590 | 0.6 | 600 | bad |

As shown in Table 1, in Comparative Example 5, irrespective of whether a nail was stuck in the first direction or the second direction, a voltage drop amount of the single cells at the $2^{nd}$ and subsequent positions was large. In addition, the maximum temperature reached about 600° C. In Comparative Examples 1 and 3, when a nail was stuck in the second direction, there was no voltage drop and the maximum temperature was minimized to 460° C. or less. However, when a nail was stuck in the first direction, a voltage drop amount was large, and the maximum temperature reached 620 to 630° C. In Comparative Example 2, unlike Comparative Examples 1 and 3, when a nail was stuck in the first direction, there was no voltage drop, and the maximum temperature was minimized to 450° C. However, when a nail was stuck in the second direction, a voltage drop amount was large, and the maximum temperature reached 640° C. Based on such results, in Comparative Examples 1 to 3 and 5, it was assumed that external short circuiting occurred through the bus bar until a CID or a fuse operated, and the temperature of a single cell increased due to a short circuit current flowing at this time.

In Example 1 and Comparative Example 4, irrespective of whether a nail was stuck in the first direction or the second direction, a voltage drop of single cells at the $2^{nd}$ and subsequent positions was not observed and the maximum temperature was suppressed to be low. Among them, in Example 1 in which a PTC element was provided on the positive electrode side and a CID was provided on the negative electrode side, the maximum temperature was minimized further and a nail penetration resistance increased to higher than in Comparative Example 4 in which a CID was provided both on the positive electrode side and the negative electrode side. That is, although the assembled battery of Example 1 had a simpler configuration than the assembled battery of Comparative Example 4, it exhibited excellent effects.

As can be clearly understood from the above results, the effects disclosed here were not exhibited, for example, when a CID was provided on the positive electrode side and/or the negative electrode side, when a CID was provided on the positive electrode side and a PTC element was provided on the negative electrode side, and when a fuse was provided along an external path (bus bar). In other words, it can be understood that an assembled battery having a configuration in which a PTC element was provided on the positive electrode side and a CID was provided on the negative electrode side was advantageous in consideration of minimizing a voltage drop of single cells at the $2^{nd}$ and subsequent positions in the nail penetration direction and preventing a temperature rise.

While the present disclosure has been described above in detail, the above embodiment and examples are only examples, and the disclosure disclosed here includes various alternations and modifications of the above specific examples.

While an electrical resistor is the PTC element 42 in the above embodiment, the present disclosure is not limited thereto. The electrical resistor may be, for example, a polymer PTC thermistor obtained by dispersing conductive powder such as carbon black or a metal in a crystalline high molecular weight polymer (polymer). In this case, it is possible to greatly change a resistance value at the melting point of the polymer. In addition, the electrical resistor may be a switch member which formed being, for example, bimetallic, and formed by bonding together two metal plates having different thermal expansion coefficients, and which becomes conductive at a predetermined temperature or less and becomes nonconductive when the temperature exceeds the predetermined temperature. The same effect as in the above embodiment can be obtained when such an electrical resistor is used.

What is claimed is:

1. An assembled battery comprising:
a plurality of single cells; and
a plurality of bus bars connecting the plurality of single cells in series,
wherein the plurality of single cells each have a pair of flat side surfaces, and are arranged such that the flat side surfaces face each other,
wherein the single cells each include a battery case having the pair of flat side surfaces, a positive electrode sheet disposed inside the battery case, a negative electrode sheet disposed inside the battery case, a nonaqueous electrolyte disposed inside the battery case, a positive electrode terminal which is electrically connected to the positive electrode sheet inside the battery case and a part of which protrudes outside of the battery case, a negative electrode terminal which is electrically connected to the negative electrode sheet inside the battery case and a part of which protrudes outside of the battery case, an electrical resistor disposed in a conductive path between the positive electrode sheet and the positive electrode terminal, and a pressure operative type current interruption mechanism disposed in a conductive path between the negative electrode sheet and the negative electrode terminal, and
wherein the electrical resistor is at least one of a positive temperature coefficient element, a positive temperature coefficient thermistor, or a bimetal.

2. The assembled battery according to claim 1,
wherein the electrical resistor is the positive temperature coefficient element, the positive temperature coefficient element having a positive temperature resistance coefficient.

3. The assembled battery according to claim 1,
wherein no current interruption mechanism is provided in the conductive path between the positive electrode terminal and the positive electrode sheet.

4. The assembled battery according to claim 1,
wherein the current interruption mechanism includes a first member and a second member, and
wherein, when an internal pressure of the battery case exceeds an operating pressure of the current interruption mechanism, bonding between the first member and the second member is cut, the conductive path between the negative electrode sheet and the negative electrode terminal is cut, and a current is blocked.

* * * * *